United States Patent
Sung et al.

(10) Patent No.: US 10,917,270 B2
(45) Date of Patent: Feb. 9, 2021

(54) MODULATION DEVICE, CONTROLLING METHOD OF MODULATION DEVICE AND VEHICLE

(71) Applicants: Hyundai Motor Company, Seoul (KR); Kia Motors Corporation, Seoul (KR); Korea Advanced Institute of Science and Technology, Daejeon (KR)

(72) Inventors: Jihoon Sung, Seoul (KR); Jinook Yoo, Yongin-si (KR); Gil Sup An, Suwon-si (KR); Joonhyuk Kang, Daejeon (KR); Seungjae Jung, Daejeon (KR); Jin Yeop Na, Daejeon (KR); Jinu Gong, Daejeon (KR)

(73) Assignees: Hyundai Motor Company, Seoul (KR); Kia Motors Corporation, Seoul (KR); Korea Advanced Institute of Science and Technology, Daejeon (KR)

( * ) Notice: Subject to any disclaimer, the term of this patent is extended or adjusted under 35 U.S.C. 154(b) by 0 days.

(21) Appl. No.: 16/560,331

(22) Filed: Sep. 4, 2019

(65) Prior Publication Data

US 2020/0328920 A1    Oct. 15, 2020

(30) Foreign Application Priority Data

Apr. 15, 2019 (KR) .......... 10-2019-0043452

(51) Int. Cl.
| | | |
|---|---|---|
| H04L 25/10 | (2006.01) | |
| H04L 27/04 | (2006.01) | |
| H04B 1/04 | (2006.01) | |
| H04B 17/10 | (2015.01) | |
| H04R 3/00 | (2006.01) | |

(52) U.S. Cl.
CPC .......... *H04L 27/04* (2013.01); *H04B 1/0475* (2013.01); *H04B 17/10* (2015.01); *H04R 3/00* (2013.01)

(58) Field of Classification Search
CPC ........ H04L 27/04; H04B 17/10; H04B 1/0475
USPC ........................................ 375/285, 296, 346
See application file for complete search history.

(56) References Cited

U.S. PATENT DOCUMENTS

| 6,549,784 B1* | 4/2003 | Kostic | H04B 1/715 |
| | | | 370/203 |
| 7,356,104 B2* | 4/2008 | Fukuda | H04B 1/7143 |
| | | | 375/346 |
| 9,928,822 B2* | 3/2018 | An | G10K 11/178 |
| 2003/0002590 A1* | 1/2003 | Kaku | H04B 1/123 |
| | | | 375/285 |
| 2004/0048574 A1* | 3/2004 | Walker | H04L 5/003 |
| | | | 455/63.1 |

(Continued)

FOREIGN PATENT DOCUMENTS

KR    10-1716248 B1    3/2017

*Primary Examiner* — Tesfaldet Bocure
(74) *Attorney, Agent, or Firm* — Morgan, Lewis & Bockius LLP

(57) ABSTRACT

A modulation device includes: a communication unit; and a controller configured to: divide a communication signal received by the communication unit into a plurality of frequency bands, determine at least one noise band including a noise signal among the plurality of frequency bands, and generate an output signal by replacing at least one of the plurality of frequency bands corresponding to the noise band with another frequency band.

11 Claims, 5 Drawing Sheets

(56) References Cited

U.S. PATENT DOCUMENTS

2008/0112427 A1* 5/2008 Seidel ................ H04W 16/10
                                                            370/433
2017/0186415 A1* 6/2017 An ..................... G10K 11/178

* cited by examiner

MODULATION DEVICE, CONTROLLING METHOD OF MODULATION DEVICE AND VEHICLE

CROSS-REFERENCE TO RELATED APPLICATION(S)

This application is based on and claims priority to Korean Patent Application No. 10-2019-0043452, filed on Apr. 15, 2019 in the Korean Intellectual Property Office, the disclosure of which is incorporated by reference in its entirety herein.

TECHNICAL FIELD

The present disclosure relates to a modulation device for efficiently controlling noise, a modulation device control method, and a vehicle-related technique.

BACKGROUND

In general, an Audio Video Navigation (AVN) system for vehicles is a system that integrates audio devices such as radio, compact disc, tape and MP3, video multimedia devices such as a DVD player, and navigation devices.

As the market for the AVN system for vehicles expands, the demand for car video and audio is increasing.

In addition, due to the characteristics of automobiles, it is necessary to have a miniaturized AVN system that is capable of realizing good picture quality and sound quality under all weather conditions such as when the vehicle shakes and in bad weather in all service areas while operating.

On the other hand, an AM broadcast frequency spectrum appears symmetrically on both sides of a carrier frequency.

At this time, if noise generated in electrical components of the vehicle exists in the AM broadcast band, it is difficult for a user to listen to the broadcast smoothly if the noise is reproduced.

Therefore, research has been actively carried out to efficiently remove the noise generated by the electric components of the vehicle.

SUMMARY

The present disclosure provides an electronic module and its control method capable of efficiently and safely managing vehicle information in a specific time domain even in the event of an accident or the like of an autonomous vehicle.

In accordance with one aspect of the present disclosure, a modulation device comprises: a communication unit; and a controller configured to: divide a communication signal received by the communication unit into a plurality of frequency bands, determine at least one noise band including a noise signal among the plurality of frequency bands, and generate an output signal by replacing at least one of the plurality of frequency bands corresponding to the noise band.

The communication unit may be configured to receive the communication signal formed symmetrically with respect to a reference frequency.

The controller may be configured to determine an alternate frequency band that is symmetrical with the noise band on the basis of the reference frequency.

The controller may be configured to replace the noise band with the alternate frequency band.

The controller may be configured to: determine a symmetric noise band formed symmetrically with respect to the noise band and the reference frequency, and remove the noise band or the symmetric noise band based on a noise intensity of the noise band and the symmetric noise band.

The controller may be configured to generate the output signal by replacing a predetermined noise band with at least one of the plurality of frequency bands.

The communication unit may further comprise at least one memory configured to store the predetermined noise band.

The communication unit may be configured to receive the communication signal including an amplitude modulation (AM) signal.

The controller may be configured to determine the at least one noise band including the noise signal among the plurality of frequency bands based on a strength of the AM signal.

In accordance with another aspect of the present disclosure, a control method of a modulation device comprises: dividing a communication signal received by a communication unit into a plurality of frequency bands; determining at least one noise band including a noise signal among the plurality of frequency bands; and generating an output signal by replacing at least one of the plurality of frequency bands corresponding to the noise band.

The control method of the modulation device may further comprise receiving the communication signal formed symmetrically with respect to a reference frequency.

The control method of the modulation device may further comprise determining an alternate frequency band that is symmetrical with the noise band on the basis of a reference frequency.

The generating of the output signal may comprise replacing the noise band with the alternate frequency band.

The generating of the output signal may comprise: determining a symmetric noise band formed symmetrically with respect to the noise band and the reference frequency; and removing the noise band or the symmetric noise band based on a noise intensity of the noise band and the symmetric noise band.

The controller may be configured to generate the output signal by replacing a predetermined noise band with at least one of the plurality of frequency bands.

The communication unit may further comprise at least one memory configured to store the predetermined noise band.

The communication signal may include an AM signal.

The at least one noise band, including the noise signal among the plurality of frequency bands, may be determined based on a strength of the AM signal.

In accordance with still another aspect of the present disclosure, a vehicle comprises: a communication unit; and a controller configured to: divide a communication signal received by the communication unit into a plurality of frequency bands, determine at least one noise band including a noise signal among the plurality of frequency bands, and generate an output signal by replacing at least one of the plurality of frequency bands corresponding to the noise band with an alternate frequency band.

BRIEF DESCRIPTION OF THE DRAWINGS

These above and/or other aspects of the disclosure will become apparent and more readily appreciated from the following description of exemplary embodiments, taken in conjunction with the accompanying drawings in which.

DETAILED DESCRIPTION

Figure 1:
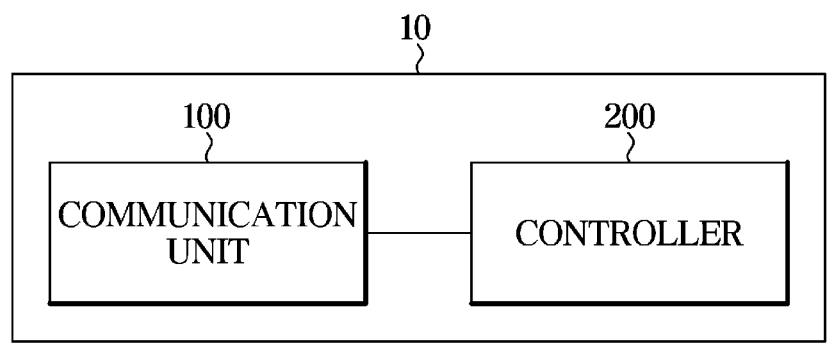
FIG. 1 is a block diagram of a modulation device according to an exemplary embodiment of the present disclosure.

Like numbers refer to like elements throughout this specification and in the drawings. This specification does not describe all components of the embodiments, and general information in the technical field to which the present disclosure belongs or overlapping information between the embodiments is also not described. The terms "part," "module," "element," and "block," as used herein, may be implemented as software or hardware, and in the disclosed embodiments, a plurality of "parts," "modules," "elements," and "blocks" may be implemented as a single component, or a single "part," "module," "element," and "block" may include a plurality of components.

It will be understood that when a component is referred to as being "connected" to another component, it can be directly or indirectly connected to the other component. When a component is indirectly connected to another component, it may be connected to the other component through a wireless communication network.

It will be understood that the terms "includes," "comprises," "including," and/or "comprising," when used in this specification, specify the presence of a stated component, but do not preclude the presence or addition of one or more other components.

It will be understood that, although the terms first, second, third, etc. may be used herein to describe various components, these components should not be limited by these terms. These terms are only used to distinguish one component from another.

It is to be understood that the singular forms "a," "an," and "the" include plural referents unless the context clearly dictates otherwise.

Reference numerals used in operations are provided for convenience of description, without describing the order of the operations. The operations can be executed in an order different from the stated order unless a specific order is definitely specified in the context.

Hereinafter, the operation principle and embodiments of the present disclosure are described with reference to the accompanying drawings.

FIG. 1 is a block diagram of a modulation device according to an embodiment.

Referring to FIG. 1, a modulation device 10 according to an embodiment may include a communication unit 100 and a controller 200.

The modulation device 10 according to one embodiment can be included in a vehicle.

The communication unit 100 may include one or more components that enable communication with an external device.

For example, at least one of a short range communication module, a wired communication module, and a wireless communication module.

The short-range communication module uses a wireless communication network, such as a Bluetooth module, an infrared communication module, an RFID (Radio Frequency Identification) communication module, a WLAN (Wireless Local Access Network) communication module, an NFC communication module, and a Zigbee communication module, and may include various short-range communication modules for transmitting and receiving.

The wireless communication module may include a wireless communication interface including an antenna and a transmitter for transmitting a communication signal.

The communication signal received by the communication unit 100 may include AM (Amplitude Modulation Broadcasting) and FM (Frequency Modulation) signals.

The AM (Amplitude Modulation Broadcasting) signal means that a carrier frequency is modulated by voice propagation and broadcasted.

FM (Frequency Modulation) can transmit all signals by changing the frequency of a radio wave instead of fixing the amplitude of the radio wave.

The FM signal can use a microwave of about 100 MHz.

The detailed operation and configuration performed by the communication unit 100 will be described later.

The controller 200 can divide the communication signal received by the communication unit into a plurality of frequency bands.

Specifically, the controller 200 can convert the communication signal received by the communication unit from a time domain to a frequency domain through FFT (fast Fourier transform).

The controller 200 can divide the communication signal in the frequency domain into a plurality of domains based on the frequency band.

The controller 200 may determine at least one noise band including a noise signal among the plurality of frequency bands.

Specifically, when the intensity of noise included in the plurality of frequency bands described above exceed a predetermined size, the controller 200 can determine the corresponding band as the noise band.

The controller 200 may generate an output signal by replacing at least one of the plurality of frequency bands corresponding to the noise bands.

The communication unit 100 may receive the communication signal formed symmetrically with reference to a reference frequency.

According to an exemplary embodiment, the communication signal received by the communication unit may include the same signal symmetrically appearing on both sides of the AM signal based on a carrier (603 kHz, 130 kHz displayed in AM channel selection).

On the other hand, the reference frequency may be provided by the carrier described above.

The controller 200 can determine an alternative frequency band that is symmetrical with the noise band based on the reference frequency.

Specifically, the noise band containing noises can be replaced with the alternative frequency band that is symmetrical with respect to the reference frequency.

Noise is included in the noise band, but the noise contained in the alternative frequency band can be reduced or eliminated.

Accordingly, the controller can determine the final output signal by replacing the noise band with the alternative frequency band.

The controller may determine the noise band and the symmetric noise band formed symmetrically with respect to the reference frequency.

The controller may remove the noise band or the symmetric noise band based on the noise band and the noise intensity included in the symmetric noise band.

Noise may also be included in the symmetric noise band symmetrical based on the noise band and the reference frequency.

The controller can compare the noise included in the noise band and the noise included in the symmetric noise band.

The controller can remove the band having a large noise level among the noise included in each of the bands.

The removed band may be replaced with the alternative frequency band as described above.

The controller may replace a predetermined noise band with at least one of the plurality of frequency bands to generate the output signal.

Specifically, in the case of electromagnetic noise generated from vehicle electrical products, there is an electrical device that always operates while power is supplied to the vehicle.

In this case, in the vehicle development stage, information such as a frequency and size of the noise can be obtained, and the noise that is constantly generated can be removed by inputting what to the controller.

The controller may replace the predetermined noise band with at least one of the plurality of frequency bands to generate the output signal.

For example, in the vehicle development stage, an electrical device always operating at 604 kHz in an upper half band of the modulation device can input information to a memory to generate noise.

When a user selects a 603 kHz channel, the controller 200 can unconditionally delete data of an upper band and demodulate the data in a lower band.

Further, the predetermined noise band determined by the above-described operation can be stored in the memory provided in the communication unit.

The memory may be implemented as at least one a non-volatile memory device (for example, cache, Read Only Memory (ROM), Programmable ROM (PROM), Erasable Programmable ROM (EPROM), Electrically Erasable Programmable ROM (EEPROM), and flash memory), a volatile memory device (for example, Random Access Memory (RAM)), or a storage medium (for example, Hard Disk Drive (HDD) and Compact Disc Read Only Memory (CD-ROM)), although not limited to these.

A controller 200 may be implemented with a memory (not shown) storing an algorithm to control operation of the components in a vehicle 1 or data about a program that implements the algorithm, and a processor (not shown) carrying out the aforementioned operation using the data stored in the memory. The memory and the processor may be implemented in separate chips. Alternatively, the memory and the processor may be implemented in a single chip.

At least one component may be added or deleted corresponding to the performance of the components of the vehicle 1 illustrated in FIG. 1. It will be readily understood by those skilled in the art that the mutual position of the components may be changed corresponding to the performance or structure of the vehicle 1. In the meantime, each of the components shown in FIG. 1 may be referred to as a hardware component such as software and/or a field programmable gate array (FPGA) and an application specific integrated circuit (ASIC).

Figure 2:
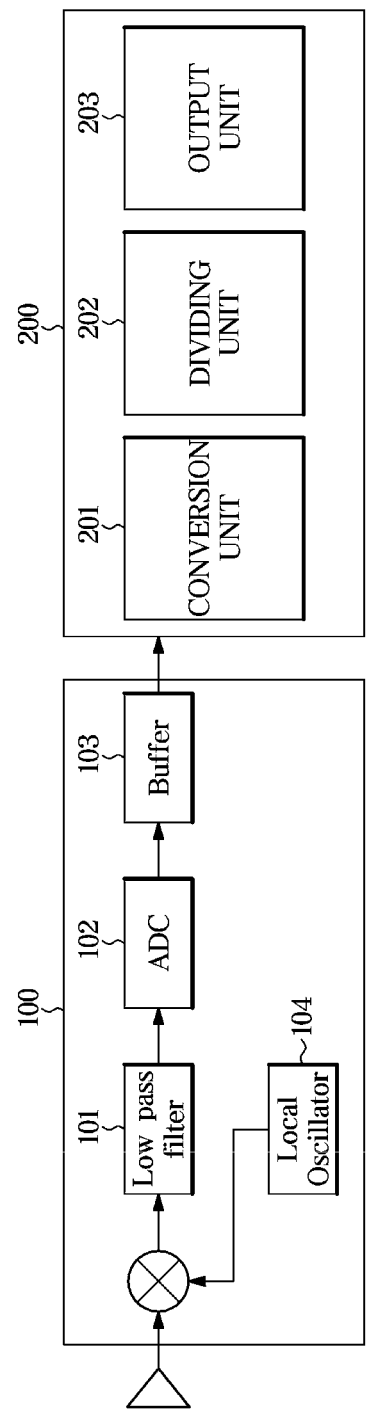
FIG. 2 is a detailed control block diagram of a modulation device according to an exemplary embodiment of the present disclosure.

FIG. 2 is a detailed control block diagram of a modulation device according to an embodiment. In FIG. 2, the communication unit 100 provided in the modulation apparatus includes a low pass filter 101, an analog-to-digital converter (ADC) 102, a local oscillator 104, and a buffer 103.

The communication signal received by the communication unit may be provided as an AM broadcast signal.

The communication unit can receive the AM signal when receiving the communication signal.

In addition, a frequency shift can be performed through an RF signal receiving unit and the local oscillator 104.

The received communication signal can also be converted into a digital signal by the analog-to-digital converter.

The communication unit 100 removes a high-frequency signal of the communication signal received through the detailed configuration described above, converts the received signal into a digital signal, and transmits the digital signal to the controller 200.

The communication signal received by the communication unit 100 may be provided as an analog signal.

N times sampling can be performed to convert the analog signal to the digital signal.

The sampled signal may be transmitted to the controller 200.

A conversion unit 201 included in the controller 200 may perform fast Fourier transform (FFT) on the received signal to convert the signal of a time band into a frequency band.

A dividing unit 202 included in the controller 200 may divide the converted signal into the plurality of frequency bands.

The divided signals can be classified into the upper band and the lower band based on the reference frequency (RF).

In addition, a noise detector included in the controller 200 can measure the noise signal included in each of the bands.

The controller may determine the band as the noise band if the noise signal included in each of the bands exceeds a predetermined size.

An output unit 203 included in the controller 200 may replace the frequency band determined as the noise band with the alternative frequency band as described later.

The controller may perform demodulation based on the replaced communication signal.

When the communication signal is an AM signal, the controller 200 may determine at least one of the noise bands including the noise signal among the plurality of frequency bands based on the strength of the AM signal included in the communication signal.

The AM signal includes intensity-based information so that the controller can determine the noise based on the strength of the signal.

On the other hand, the controller can effectively remove harmonic noise having a fundamental frequency similar to that of a narrow-band AM channel generated in the AM broadcast, without loss of the original signal by software processing of an audio apparatus without changing the hardware.

In case of noise existing in both sidebands simultaneously, the controller can be removed by dividing each sideband into a plurality of slots and comparing them. The detailed description related to the operation of the controller will be described later.

Figure 3:
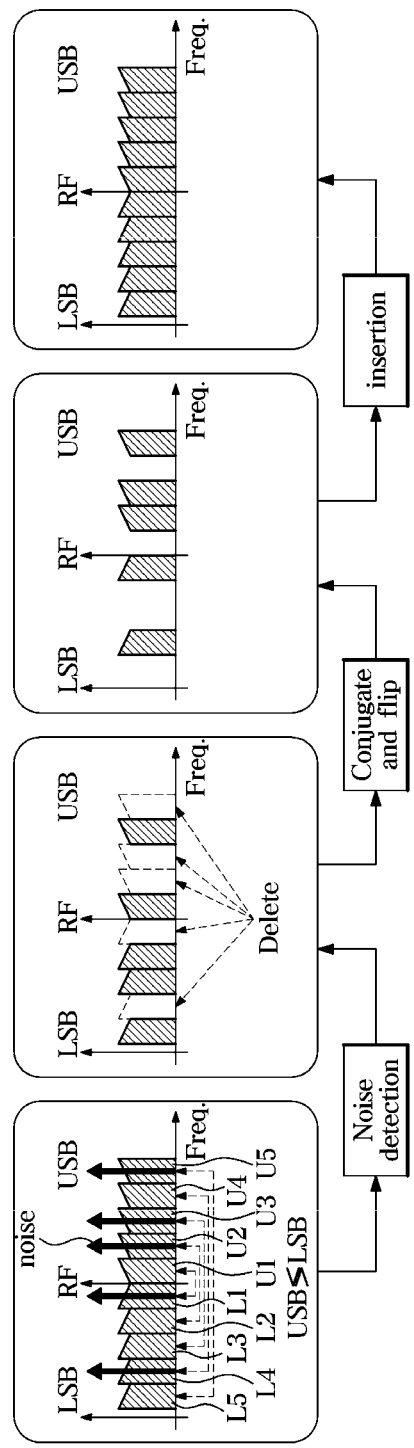
FIG. 3 is a view for explaining an operation of replacing a noise band according to an exemplary embodiment of the present disclosure.

FIG. 3 is a view for explaining an operation of replacing a noise band according to an embodiment.

A pre-operation communication unit shown in FIG. 3 may receive an AM broadcast signal and perform a frequency transition operation at a reference frequency through the local oscillator or the like.

Further, the communication unit can convert the analog signal of the received signal into a digital signal.

On the other hand, the controller can perform fast Fourier transform upon receiving the converted signal based on the above-mentioned operation.

On the other hand, when an upper side (USB) is divided into M frequency bands based on the reference frequency, an upper sideband signal can be determined as follows.

$$Y_{USB,j}(k) = Y(k), \quad \text{[Equation 1]}$$
$$k = \frac{N}{2} - \frac{N}{2M}j + 1, \ldots, \frac{N}{2} - \frac{N}{2M}(j-1),$$

Referring to Equation (1), $Y_{USB,j}(k)$ denotes the upper sideband of the reference frequency, N denotes the number of sampled signals, and M denotes the number of the divided regions of the upper or lower sideband.

On the other hand, the signal of a lower sideband (LSB) can be determined as follows.

$$Y_{LSB,j}(k) = Y(k), \quad \text{[Equation 2]}$$
$$k = \frac{N}{2} + \frac{N}{2M}(j-1) + 1, \ldots, \frac{N}{2} - \frac{N}{2M}j,,$$

Referring to Equation (2), $Y_{LSB,j}(k)$ denotes the lower sideband of the reference frequency, N denotes the number of sampled signals, and M denotes the number of divided regions of the upper side or lower sideband.

The controller can detect noise in the communication signal divided by the above-described method.

In FIG. 3, noises are detected in first and fourth regions (L1 and L4) of the lower sideband in upper, lower, and lower half regions (U2, U3, U5).

The controller can determine the frequency band including the noise as the noise band and remove the noise band.

In FIG. 3, it is shown that the upper band 2, 4, 5 (U2, U3, U5) and the lower band 1, 4 (L1, L4) are removed.

According to an exemplary embodiment, the controller may compare the noise magnitudes of upper second (U2) band and the lower second band (L2) based on the reference frequency.

In FIG. 3, it is shown that noise is included in the upper band (U2) and noise is present in the lower band (L2).

The controller can remove the signals of the upper band (U2) including the noise.

On the other hand, the controller can remove the upper 2, 4, 5 areas (U2, U3, U5) and the lower side 1, 4 areas (L1, L4) in the same manner.

In addition, the controller may replace the signal of the band removed by the operation described above with an alternative frequency band.

The alternative frequency band can be defined as a band that exists in symmetry with the noise band based on the reference frequency.

In FIG. 3, the controller can determine the upper band (U2) as a noise band and the alternative frequency band replacing the removed noise band as the lower band (L2).

The controller can replace the removed noise band with the alternative frequency band.

The operation described above may be performed by flipping the signal on the basis of the reference frequency and performing conjugate conversion on the signal.

A flip operation may refer to the operation of converting signals [a b c d] to [d c b a] on the basis of a reference axis.

Conjugate conversion operations may refer to an operation of determining the complex conjugate of a signal represented by a complex number.

On the other hand, the controller can generate the entire output signal by inserting the converted signal into the signal from which the noise band is removed based on the above-described operation.

The output signal thus generated can be converted into a time-band signal again through inverse Fourier transform and modulation.

FIG. 3 is only an example for explaining the operation of the present disclosure, and there is no limitation on the operation of removing and replacing the noise band.

Figure 4:
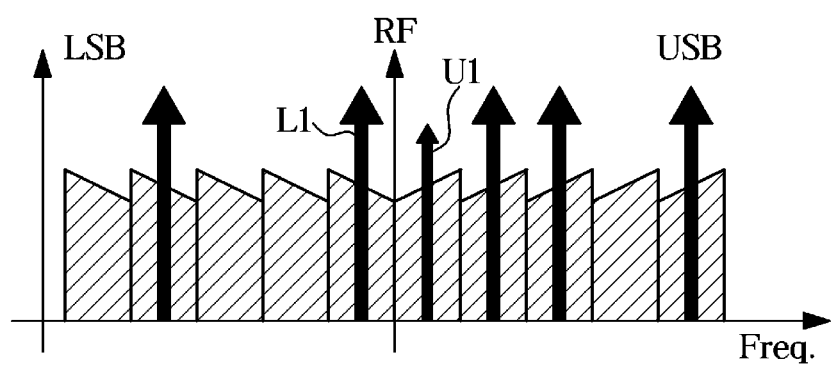
FIG. 4 is a diagram for explaining an operation of replacing a frequency band based on the intensity of a noise according to an exemplary embodiment of the present disclosure.

FIG. 4 is a diagram for explaining an operation of replacing a frequency band based on the size of a noise according to an embodiment.

Referring to FIG. 4, it is shown that noise is included in both the (U1) region and the (L1) region around the reference frequency.

When noise is included in all the bands symmetric with respect to the reference frequency, the controller can determine the magnitude of the noise included in each of the bands.

In other words, the controller can determine the symmetric noise band formed symmetrically with respect to the noise band and the reference frequency.

The controller may remove the noise band or the symmetric noise band based on the noise band and the noise intensity included in the symmetric noise band.

Specifically, the controller can eliminate the noise intensity by determining the (L1) region as the noise band, and replace the (U1) region with the (L1) region.

That is, if noise is included in all of the symmetric bands divided on the basis of the reference frequency, the band having strong noise intensity can be removed.

The operation described with reference to FIG. 4 is only an exemplary embodiment of the present disclosure, and there is no restriction on the operation of replacing the signal of the band including noise in the signal.

Figure 5:
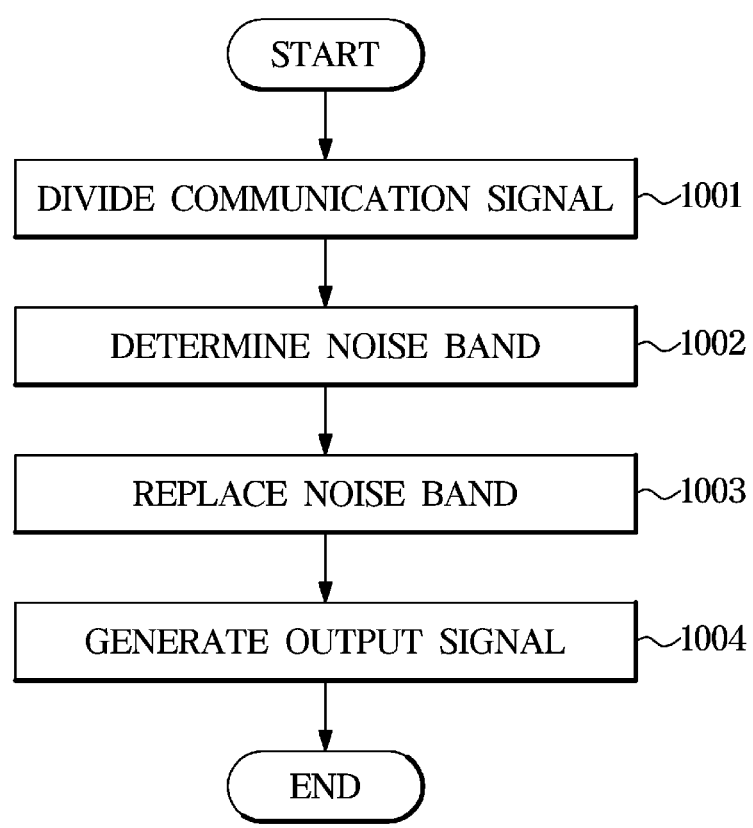
FIG. 5 is a flowchart according to an exemplary embodiment of the present disclosure.

FIG. 5 is a flowchart according to one embodiment.

Referring to FIG. 5, the modulation device receives a communication signal, and the controller can divide the communication signal (1001).

As described above, the controller can divide the upper sideband and the lower sideband based on the reference frequency.

Further, the controller may determine the noise band (1002) if noise is included in each of the bands based on the intensity of the noise signal included in each of the bands.

The controller may replace the band determined as the noise band (1003).

The flip and conjugate operations can be performed as described above in the controller for replacing the noise band.

The controller may generate an output signal based on the signal that replaces the noise band (1004).

The embodiments as described above may be embodied in the form of a recording medium to store commands that can be executed by a computer. The commands may be stored in the form of program codes, and can create a program module, when executed by a processor, to perform the operations of the above-described embodiments. The recording medium may be embodied as a computer-readable recording medium.

The computer-readable recording medium may be or include any kind of recording device to store commands that can be interpreted by a computer. For example, the computer-readable recording medium may be ROM, RAM, a magnetic tape, a magnetic disk, flash memory, or an optical data storage device.

For the vehicle and the control method thereof according to the embodiments of the present disclosure, by recognizing the driving situation of the vehicle upon autonomous driving, and controlling the components of the vehicle when a dangerous situation is sensed, safe autonomous driving is possible.

Although various embodiments of the present disclosure have been shown and described herein, it should be appreciated by those having ordinary skill in the art that changes may be made in the disclosed embodiments without departing from the principles and spirit of the disclosure, the scope of which is defined in the claims and their equivalents.

What is claimed is:

1. A modulation device comprising:
a communication unit; and
a controller configured to:
divide a communication signal received by the communication unit into a plurality of frequency bands,
determine each of at least one frequency band including a noise signal among the plurality of frequency bands as a noise band,
determine a frequency band, which is symmetrical with the noise band among the plurality of frequency bands, as an alternate frequency band based on a reference frequency, the reference frequency being for classifying an upper band and a lower band that are symmetrical to each other, and
generate an output signal by replacing with the alternate frequency,
wherein the alternate frequency band is included in the lower band if the noise band is included in the upper band, and
wherein the alternate frequency band is included in the upper band if the noise band is included in the lower band.

2. The modulation device according to claim 1, wherein the controller is configured to:
determine the frequency band, which is symmetrical with the noise band, as a symmetric noise band if the frequency band, which is symmetrical with the noise band, includes the noise signal, and
remove the noise band or the symmetric noise band based on a noise intensity of the noise band and the symmetric noise band.

3. The modulation device according to claim 1, wherein the controller is configured to generate the output signal by replacing a predetermined noise band with at least one of the plurality of frequency bands.

4. The modulation device according to claim 3, further comprising at least one memory configured to store the predetermined noise band.

5. The modulation device according to claim 1, wherein the communication signal includes an amplitude modulation signal.

6. A control method of a modulation device comprising:
dividing a communication signal received by a communication unit into a plurality of frequency bands;
determining each of at least one frequency band including a noise signal among the plurality of frequency bands as a noise band;
determining a frequency band, which is symmetrical with the noise band among the plurality of frequency bands, as an alternate frequency band based on a reference frequency, the reference frequency being for classifying an upper band and a lower band that are symmetrical to each other; and
generating an output signal by replacing with the alternate frequency,
wherein the alternate frequency band is included in the lower band if the noise band is included in the upper band, and
wherein the alternate frequency band is included in the upper band if the noise band is included in the lower band.

7. The control method of claim 6, wherein the generating an output signal comprises:
determining the frequency band, which is symmetrical with the noise band, as a symmetric noise band if the frequency band that is symmetrical with the noise band includes the noise signal, and
removing the noise band or the symmetric noise band based on a noise intensity of the noise band and the symmetric noise band.

8. The control method of claim 6, wherein the generating an output signal includes generate the output signal by replacing a predetermined noise band with at least one of the plurality of frequency bands.

9. The control method of claim 8, wherein the modulation device comprises at least one memory configured to store the predetermined noise band.

10. The control method of claim 6, wherein the communication signal includes an amplitude modulation signal.

11. A vehicle comprising:
a communication unit; and
a controller configured to:
divide a communication signal received by the communication unit into a plurality of frequency bands,
determine each of at least one frequency band including a noise signal among the plurality of frequency bands as a noise band,
determine a frequency band, which is symmetrical with the noise band among the plurality of frequency bands, as an alternate frequency band based on a reference frequency, the reference frequency being for classifying an upper band and a lower band that are symmetrical to each other, and
generate an output signal by replacing the noise band with the alternate frequency band,
wherein the alternate frequency band is included in the lower band if the noise band is included in the upper band, and
wherein the alternate frequency band is included in the upper band if the noise band is included in the lower band.

* * * * *